United States Patent
Sauer et al.

(10) Patent No.: US 11,490,762 B2
(45) Date of Patent: Nov. 8, 2022

(54) COOKING APPARATUS WITH FILTER ELEMENT

(71) Applicant: KONINKLIJKE PHILIPS N.V., Eindhoven (NL)

(72) Inventors: Stefan Hans Sauer, Eindhoven (NL); Jan Vaupot, Eindhoven (NL); Markus Oswald Grubelnig, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 678 days.

(21) Appl. No.: 15/562,244

(22) PCT Filed: Mar. 24, 2016

(86) PCT No.: PCT/EP2016/056562
§ 371 (c)(1),
(2) Date: Sep. 27, 2017

(87) PCT Pub. No.: WO2016/156205
PCT Pub. Date: Oct. 6, 2016

(65) Prior Publication Data
US 2018/0078089 A1    Mar. 22, 2018

(30) Foreign Application Priority Data

Apr. 3, 2015   (EP) .................................... 15248009

(51) Int. Cl.
*A47J 37/06*    (2006.01)
*A47J 36/38*    (2006.01)

(52) U.S. Cl.
CPC ........... *A47J 37/0641* (2013.01); *A47J 36/38* (2013.01)

(58) Field of Classification Search
CPC .. A47J 37/0641; A47J 39/003; A47J 37/0623; A47J 37/101; A47J 37/0647;
(Continued)

(56) References Cited

U.S. PATENT DOCUMENTS 2,498,534 A    2/1950  Drum
2,999,559 A    9/1961  Boyer
(Continued)

FOREIGN PATENT DOCUMENTS

CA    2465319 A1    4/2005
CN    201836954 U   5/2011
(Continued)

OTHER PUBLICATIONS

English translation of JP-03123625-A (Year: 1991).*
English translation of WO-2015006891-A1 (Year: 2015).*

*Primary Examiner* — Chris Q Liu
(74) *Attorney, Agent, or Firm* — Schott, P.C.

(57) ABSTRACT

The present application relates to a cooking apparatus (1) comprising a cooking chamber (2), a basket (3) disposed within the cooking chamber (2) to receive food (4) to be cooked, a heating element (5) disposed above the food basket (3) for heating air flowing out from the food basket (3), an air circulation system (6, 12, 13) for circulating the heated air upwards within the food basket (3) and a filter element (7) disposed between the food basket (3) and the heating element (5). The filter element (7) is spaced from the heating element (5). The filter element (7) comprises an air-permeable meshed structure for retaining particles contained in the air flowing out from the food basket (3). The food basket (3) comprises an upper opening (11), and the filter element (7) extends entirely over the upper opening (11).

18 Claims, 4 Drawing Sheets

(58) Field of Classification Search
CPC ........ A47J 43/046; A47J 27/004; A47J 27/14;
A47J 36/165; A47J 37/0629; A47J
37/0722; A47J 37/10; A47J 37/1204;
A47J 39/006; A47J 36/38; A47J 37/128;
A47J 27/04; A47J 27/08; A47J 27/0802;
A47J 27/0804; A47J 27/086; A47J 36/12;
A47J 37/1223; A47J 37/1266; A47J
43/0772; A21B 1/48; A21B 5/02; F24C
15/325; F24C 15/322; F24C 15/32; F24C
15/2014; F24C 7/10; F24C 15/006; F24C
15/08; F24C 7/06; F24C 7/082; F24C
7/087; H05B 6/6473; H05B 6/6485;
H05B 6/6476; H05B 6/666; H05B 6/687;
H05B 6/74; H05B 3/86; H05B 6/64;
H05B 6/6402; H05B 6/6411; H05B
6/642; H05B 6/6426; H05B 6/704; H05B
6/705; H05B 6/708; H05B 6/72; H05B
6/725; H05B 6/766

USPC ......... 99/474, 324, 330, 339, 447, 347, 348,
99/352, 403, 409, 418, 422, 443 C, 444,
99/446, 451, 467, 475, 480, 495, 645;
219/400, 681, 399, 405, 702, 385, 411,
219/388, 413, 696, 720, 746, 757, 386,
219/391, 392, 393, 395, 398, 409, 410,
219/412, 491, 494, 507, 679, 683, 710,
219/715, 732, 734, 741, 751, 763
See application file for complete search history.

(56) References Cited

U.S. PATENT DOCUMENTS

| | | | |
|---|---|---|---|
| 3,828,760 A | 8/1974 | Farber et al. | |
| 4,684,466 A * | 8/1987 | Terpstra | B30B 9/26 |
| | | | 100/116 |
| 5,436,434 A | 7/1995 | Baird | |
| 5,992,675 A | 11/1999 | Kerr | |
| 7,834,299 B2 * | 11/2010 | Claesson | H05B 6/6426 |
| | | | 219/681 |
| 3,011,293 A1 | 9/2011 | McFadden et al. | |
| 2005/0223906 A1 | 10/2005 | Xu | |
| 2006/0156926 A1 | 7/2006 | Alemao | |
| 2008/0105133 A1 | 5/2008 | McFadden | |
| 2008/0105135 A1 | 5/2008 | McFadden | |
| 2009/0158940 A1* | 6/2009 | Archer | A47J 39/006 |
| | | | 99/403 |
| 2010/0247844 A1 | 9/2010 | Curro | |
| 2011/0288319 A1* | 11/2011 | Profughi | A47J 37/1223 |
| | | | 210/167.28 |
| 2014/0020569 A1 | 1/2014 | Webb | |

FOREIGN PATENT DOCUMENTS

| | | | | |
|---|---|---|---|---|
| CN | 103690065 | | 4/2014 | |
| GB | 2007515 A | | 5/1979 | |
| GB | 2124073 A | * | 2/1984 | ......... A47J 37/1204 |
| JP | 03123625 A | * | 5/1991 | |
| JP | H082409 B2 | | 1/1996 | |
| WO | 200040468 A1 | | 7/2000 | |
| WO | 2005017415 A1 | | 2/2005 | |
| WO | WO-2015006891 A1 | * | 1/2015 | ......... A47J 37/0641 |

* cited by examiner

COOKING APPARATUS WITH FILTER ELEMENT

This application is the U.S. National Phase application under 35 U.S.C. § 371 of International Application No. PCT/EP2016/056562, filed on Mar. 24, 2016, which claims the benefit of International Application No. 15248009.1 filed on Apr. 3, 2015. These applications are hereby incorporated by reference herein.

FIELD OF THE INVENTION

The invention relates to a cooking apparatus and, in particular, to a cooking apparatus using a circulation of hot air to cook food.

BACKGROUND OF THE INVENTION

Air-based fryer products are cooking apparatuses that generally comprise a food basket within a cooking chamber to receive food to be cooked. Air is passed over a heating element and circulated within the cooking chamber and through the basket to cook the food. Such devices advantageously provide a compact appliance for cooking food in a healthy manner, as use of additional cooking liquid such as oil or fat is unnecessary.

Air-based fryers may be multi-purpose cooking apparatuses and so are required to be able to cook as many different recipes and types of food as possible. However, such multi-purpose use can present some drawbacks. For example, if food with a naturally fatty or greasy content is cooked, smoke may be generated as the oil or fat is entrained in the rising hot air flow and comes into contact with the heating element above the food-chamber.

U.S. Pat. No. 3,828,760 discloses a cooking apparatus comprising a cooking chamber with a pan and a rack upon which food to be cooked is placed, and a fan to pass air over a heating element and circulate the heated air within the cooking chamber. A filter is provided to prevent food soil and grease from contacting the fan.

GB 2 007 515 and US 2008/105135 disclose cooking apparatuses comprising means to circulate heated air within a cooking chamber.

SUMMARY OF THE INVENTION

It is an object of the invention to provide a cooking apparatus that substantially alleviates or overcomes one or more of the problems mentioned above.

The invention is defined by the independent claims. The dependent claims define advantageous embodiments.

According to the present invention, there is provided a cooking apparatus comprising a cooking chamber, a basket disposed within the cooking chamber to receive food to be cooked, a heating element disposed above the food basket for heating air flowing out from the food basket, a system for circulating the heated air upwards within the food basket and a filter element disposed between the food basket and the heating element, the filter element being spaced from the heating element, the filter element comprising an air-permeable meshed structure for retaining particles contained in the air flowing out from the food basket, and wherein the food basket comprises an upper opening, and the filter element extends entirely over the upper opening.

Thanks to having the filter element disposed between the food basket and the heating element, the particles of fat contained in the air flowing out from the food basket are blocked by the filter element, without blocking air itself. As a result, the fat particles do not reach the heating element are do not get burnt anymore. This reduces the generation of cooking smokes. Similarly, the other solid particles contained in the air flowing out from the food basket, for example crumbs from food being cooked, are blocked by the filter element. Also, the filter element extending entirely over the upper opening helps to prevent any airflow escaping around the sides of the filter element and to ensure that all air flow is filtered by the filtering element.

Advantageously, the filter element has an opacity of at least 50%. This provides effective food particle filtering benefits. Advantageously, a surface area of the filter element projected directly beneath the heating element has an opacity of at least 50%.

Advantageously, the meshed structure of the filter element comprises a plurality of apertures with maximum outer dimensions not exceeding 1 mm by 1 mm. The maximum outer dimensions of the apertures may be between 0.3 mm by 0.3 mm and 1 mm by 1 mm. This provides increased effectiveness at filtering food particles from air flow passing through the filter element.

Advantageously, the filter element is detachably secured to the food basket. This enables easy removal and cleaning of the filter element.

Advantageously, the filter element comprises first attaching means, the food basket may comprise second attaching means, and the first attaching means and the second attaching means may be adapted to cooperate to detachably secure the filter element to the food basket. This further advantageously enables easy removal and cleaning of the filter element.

Advantageously, the filter element is detachably secured to the cooking chamber and is spaced from the food basket. This alternative configuration also helps preventing airflow escaping around the sides of the filter element and ensure all air flow is filtered by the filtering element. Also, this enables easy removal and cleaning of the filter element.

Advantageously, the filter element comprises first attaching means, the cooking chamber may comprise second attaching means, and the first attaching means and the second attaching means may be adapted to cooperate to detachably secure the filter element to the cooking chamber. This enables easy removal and cleaning of the filter element.

Advantageously, the apertures of the meshed structure of the filter element have a uniform shape. This enables simple and cost-effective filter element manufacture.

Advantageously, the apertures of the meshed structure of the filter element are taken among the set of shapes defined by square, rectangular, hexagonal and regular polygonal. This allows an easier manufacturing of the filter element.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Figure 1:
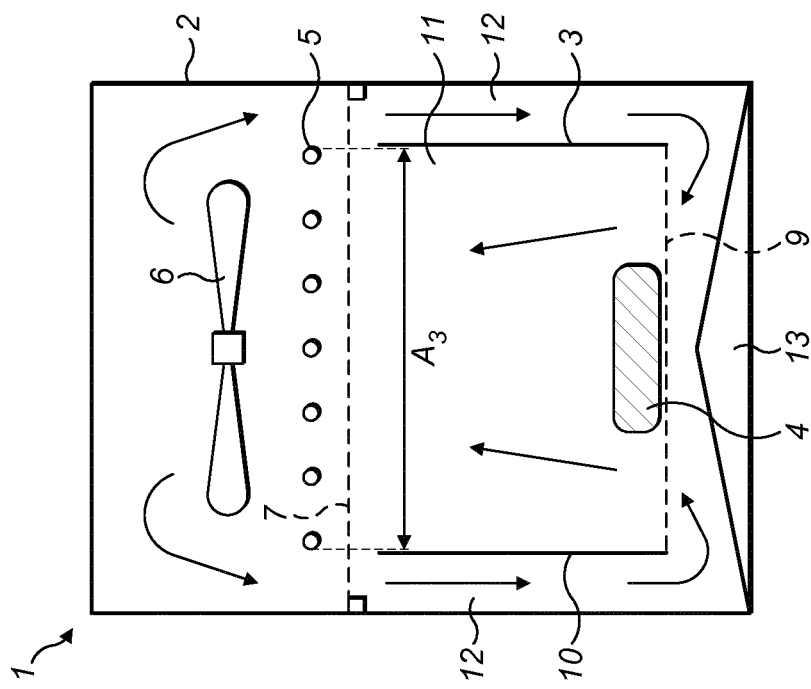
FIG. 1 shows a schematic cross-sectional view of a cooking apparatus of a first embodiment of the invention.

FIG. 1 shows a cooking apparatus according to a first embodiment of the invention.

The cooking apparatus 1 comprises a cooking chamber 2 and a basket 3 is disposed within the cooking chamber 2 to receive food 4 to be cooked. A heating element 5 is disposed above the food basket 3 for heating air flowing out from the food basket 3. An air circulation system is provided for circulating the heated air upwards within the food basket. A filter element 7 is disposed between the food basket 3 and the heating element 5 and is spaced from the heating element 5. The filter element 7 comprises an air-permeable meshed structure for retaining particles contained in the air flowing out from the food basket 3.

For example, the air circulation system preferably comprises a fan 6 mounted above the heating element 5 driven by a motor (not shown), air flow passages 12 defined in a space between the food basket 3 and the walls of the cooking chamber 2, and an air flow guide 13 (optionally) provided in the base of the cooking chamber 2 to help air flow upwards in the food basket 3. In use, the fan 6 is operated to draw air through the food basket 3, over the heating element 5 to heat the air, and the heated air passes in the direction shown by the arrows in FIG. 1 through the air flow passages 12 to the bottom of the cooking chamber 2. From there, the heated air is diverted upwards by the air flow guide 13 back into the food basket 3 to heat and cook food 4 contained therein.

Figure 3:
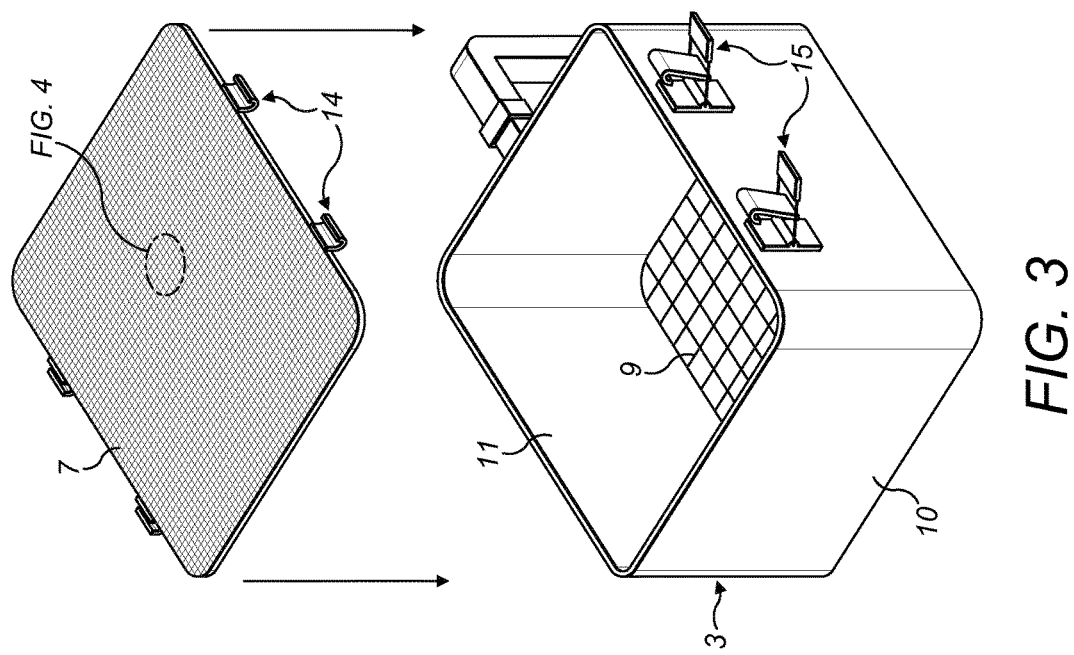
FIG. 3 shows a perspective view of a food basket and filter element for use with the cooking apparatus of FIG. 1.

Referring to FIG. 3, the food basket preferably comprises a bottom wall 9, side walls 10 and an upper opening 11 at its supper side. The bottom wall 9 is advantageously of an open structure to allow air flow therethrough but to also support food 4 to be cooked thereon.

Figure 6:
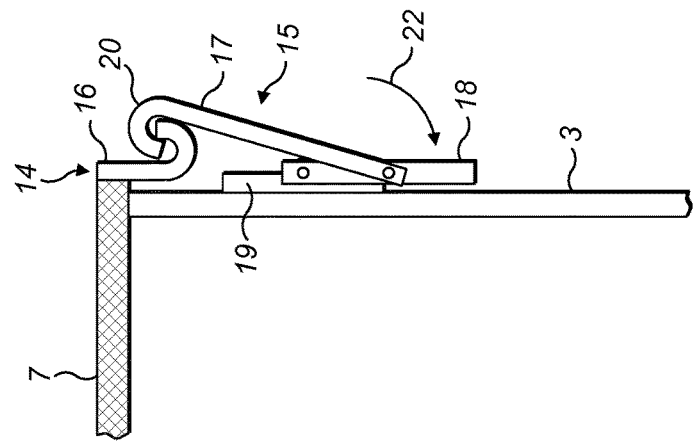
FIG. 6 shows an enlarged side view of attaching means for securing the filter element to the food basket shown in FIG. 3, in an engaged position.
Figure 5:
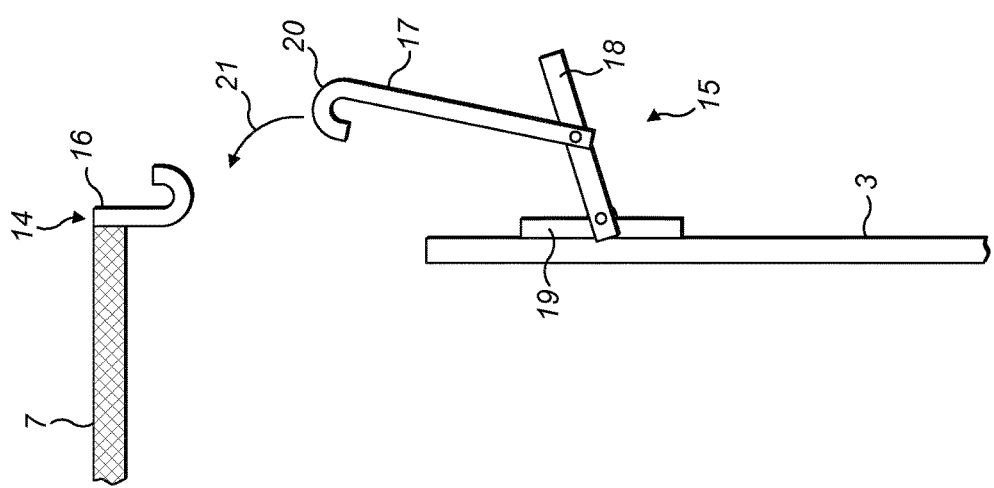
FIG. 5 shows an enlarged side view of attaching means for securing the filter element to the food basket shown in FIG. 3, in a disengaged position.

In the exemplary embodiment of the invention shown in FIGS. 1 and 3, the filter element 7 is detachably secured to the food basket 3 and extends across the upper opening 11. The filter element 7 and the food basket 3 respectively comprise first and second attaching means 14, 15 which are configured to cooperate to secure the filter element 7 to the food basket 3. The first and second attaching means 14, 15 are shown in more detail in FIGS. 5 and 6. The first attaching means 14 comprises a pair of projections 16 formed along opposite edges of the filter element 7. The second attaching means 15 comprises a correspondingly positioned pair of latch mechanisms on opposite sides of the food basket 3. Each latch mechanism comprises a latch member 17 connected to a lever 18, the lever 18 being pivotally attached at one end thereof to the side of the food basket 3 by a securing plate 19. The latch member 17 is pivotally connected to the lever 18 between the remote ends of the lever 18. The latch members 17 each include a hook 20 at one end thereof.

To secure the filter element 7 to the food basket 3, the filter element 7 is placed on the food basket 3 covering the upper opening 11, so that the first attaching means 14 on the filter element 7 align with the second attaching means 15 on the food basket 3. The lever 18 of each latch mechanism is pivoted upwards to allow the hook 20 of each latch member 17 to be hooked over the respective projection 16 on the filter element 7, as shown by arrow 21. Each lever 18 is then pivoted downwards as shown by arrow 22 until it lies against the side of the food basket 3, which causes the latch members 17 to pull their respective projections 16 tightly downwards, securing the filter element 7 to the food basket 3. To detach the filter element 7 from the food basket 3, the reverse of the above procedure is performed.

Figure 4:
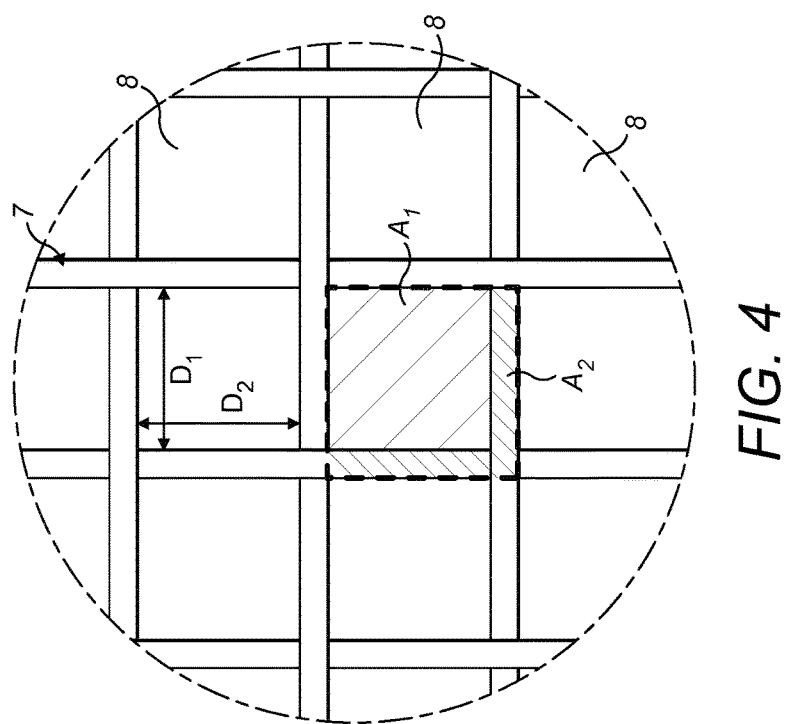
FIG. 4 shows an enlarged view of a meshed structure of the filter element shown in FIG. 3.

An enlarged view of a portion of the filter element 7 is shown in FIG. 4. This shows in more detail the fine meshed structure of the filter element 7. The meshed structure in the exemplary embodiment of the invention shown comprises a lattice of wires 23 resulting in a plurality of generally square apertures 8 in the meshed structure. Each aperture 8 has maximum outer dimensions measured in perpendicular directions to each other, of $D_1$ and $D_2$, as shown in FIG. 4. In a preferred embodiment of the invention, $D_1$ and $D_2$ may each be less than or equal to 1 mm, and in one embodiment may each be between 0.3 mm to 0.4 mm. However, the invention is not intended to be limited to these particular aperture 8 dimensions. It is also intended within the scope of the invention that the meshed structure of the filter element 7 may comprise alternative shaped apertures 8 other than square, for example circular, oval, rectangular, hexagonal or other polygonal shapes. In such alternative embodiments, the maximum outer dimensions $D_1$ and $D_2$ would similarly be measured in directions perpendicular to each other to define the smallest quadrilateral within which the aperture 8 shape would fit.

The meshed structure of the filter element 7 may be generally uniform across its surface area, and defines areas occupied by the material of the filter element 7, namely the wires 23, and areas of open space, namely the apertures 8. This is illustrated in FIG. 4 which shows an area 24 marked in dashed lines that represents the smallest repeated unit of the meshed structure. Within this marked area 24, area $A_1$ represents the area occupied by the aperture 8 and area $A_2$ represents the area occupied by the wires 22. An "opacity" of the meshed structure of the filter element 7 is defined as the ratio R of open area to the total area, namely $R = A_1/(A_1+A_2)$. For example, if the area $A_1$ was 7 mm$^2$ and the area $A_2$ was 3 mm$^2$, then the total area would be 10 mm$^2$ with an opacity ratio of 70%.

Since the marked area 24 in FIG. 4 described above represents a repeated unit of area of the meshed structure, and the meshed structure of the exemplary embodiment shown is generally uniform, then an opacity ratio for the marked area 24 represents an opacity ratio for the entire meshed structure of the filter element 7. In a preferred embodiment of the invention, the opacity ratio of the filter element 7 is at least 50%, and is preferably at least or around 60%. However, the invention is not intended to be limited to these particular opacity ratios. It is intended within the scope of the invention that the filter element 7 may comprise alternative opacity ratios. In a preferred embodiment of the invention, a surface area of the filter element 7 projected directly beneath the heating element 5 has the above-mentioned opacity. Such area is indicated as area $A_3$ by the double-headed arrow in FIGS. 1 and 2. This advantageously ensures the filtering effect of the filter element 7 occurs in the region directly beneath the heating element 5. Within the scope of the invention, the area $A_3$ of the filter element 7 beneath the heating element may be uniform, and areas of the filter element 7 outside this area $A_3$ may be of a different shape, configuration or opacity.

The meshed structure of the filter element 7 is preferably configured to allow air to pass through as circulated by means of the air circulation system described above. However, the filter element 7 prevents food particles and oil and fat droplets to be caught in the filter element 7. This prevents these particles from coming into contact with the heating element 5 and so significantly reduces the amount of smoke that is generated during a cooking process.

In operation of the cooking apparatus, food 4 to be cooked is placed in the food basket 3 and the filter element 7 is secured to the food basket as described above. The food basket is then placed in the cooking chamber 2 and the cooking apparatus 1 is switched on to perform a cooking operation. In the cooking operation, the heating element 5 is activated and the fan 6 draws air up over the heating element 5 to heat the air. The heated air is then circulated along the air passages 12 around the food basket 3 and diverted upwards by the air flow guide 13, through the openings in the bottom wall 9 of the food basket 3 and into contact with the food 4 to cook the food 4.

As the food 4 is cooked, any food particles which may become entrained in the upward airflow, for example, bread crumbs or other loose coatings on food 4 being cooked, are blocked from passing out of the food basket 3 by the filter element. Also, any oil or fat droplets or vapour that is drawn up from the food is caught in the mesh of the filter element. Therefore, both food particles and oil and fat are prevented from coming into contact with the heating element 5, thereby preventing smoke being generated.

After a cooking operation is complete, the filter element 7 may be detached from the food basket 3 as described above, and any food particles, oil or fat caught in the meshed structure can be cleaned off before a subsequent cooking operation.

A further advantage provided by the cooking apparatus of the present invention is that since oil and fat from the cooking food 4 is trapped in the filter element 7, it is prevented from being circulated around the cooking chamber 2 with the hot air flow. This therefore significantly reduces the amount of oil and fat that is deposited on the various surfaces of the cooking appliance 1, such as the inside walls of the cooking chamber 2, the outside of the side walls 10 of the food basket 3 and around the heating element 5 and any surround protective heat shield or guard (not shown).

A yet further advantage provided by the cooking apparatus of the present invention is that since food particles, such as bread crumbs, are prevented from leaving the food basket 3 and are prevented from circulating around the cooking apparatus in the hot air flow, these particles are prevented from being deposited not only in, but also around the outside of the cooking apparatus 1. This is because, in some configurations of cooking apparatus, an air exhaust is provided to allow some air within the cooking apparatus to be exhausted from the cooking chamber due to expansion of heated air, and for the circulating cooking air to be refreshed and replenished. If food particles become entrained in the circulating air flow, they may exit the cooking appliance through vents (not shown) with the exhausted air, resulting in the food particles being deposited around the outside of the cooking apparatus 1. This can cause an unsightly and inconvenience mess needing to be cleared up and the surface upon which the cooking apparatus 1 is resting to be cleaned.

With the cooking apparatus 1 of the invention however, such food particles are prevented from circulating with the hot air flow and are retained in the food basket 3 or in the bottom of the cooking chamber 2 where they can be easily collected.

The cooking apparatus 1 of the first embodiment is shown and described with projections 16 and latch mechanisms as the first and second attaching means 14, 15 which secure the filter element 7 to the food basket 3. However, the invention is not intended to be limited to this configuration of attaching means 14, 15 and alternative attaching means may be provided within the scope of the invention. Such alternative configurations of attaching means 14, 15 may include cooperating clips, cooperating snap-fit connectors or magnetic attaching means.

Figure 2:
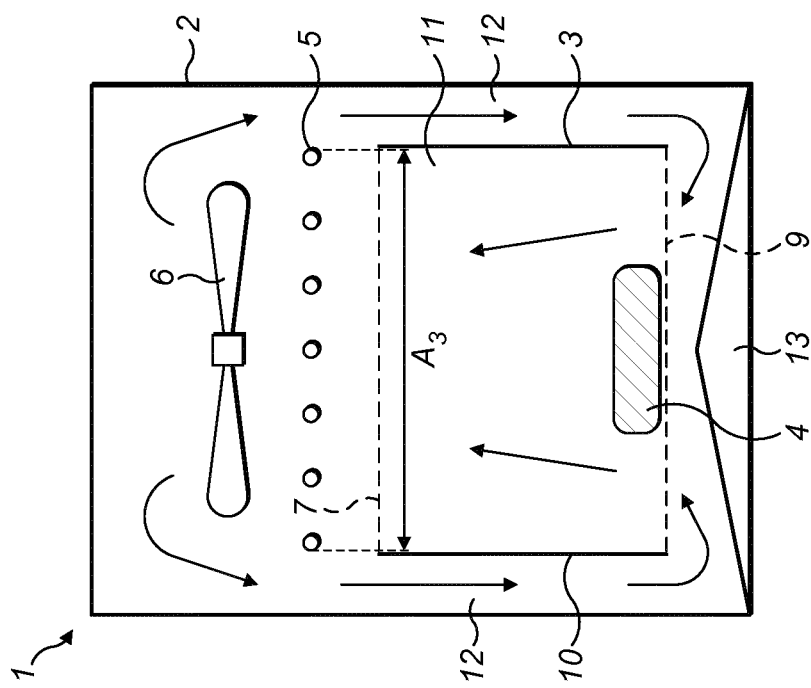
FIG. 2 shows a schematic cross-sectional view of a cooking apparatus of a second embodiment of the invention.

A cooking apparatus 1 of a second embodiment of the invention is shown in FIG. 2. Features in common with the cooking apparatus of the first embodiment share the same reference numerals and description thereof will not be repeated. A difference of the cooking apparatus 1 of the second embodiment is that the filter element 7 is not secured to the food basket 3 but instead is secured to the cooking chamber 2. The filter element 7 extends entirely across the cooking chamber 2 so that upward air flow from within the food basket passes through the filter element 7 and also downward air flow through the air passages 12 flows through the filter element 7.

The filter element 7 comprises first attaching means 25 and the cooking chamber comprises second attaching means 26. The first and second attaching means are configured to cooperate to engage and disengage to detachably secure the filter element 7 within the cooking chamber 2.

Figure 8:
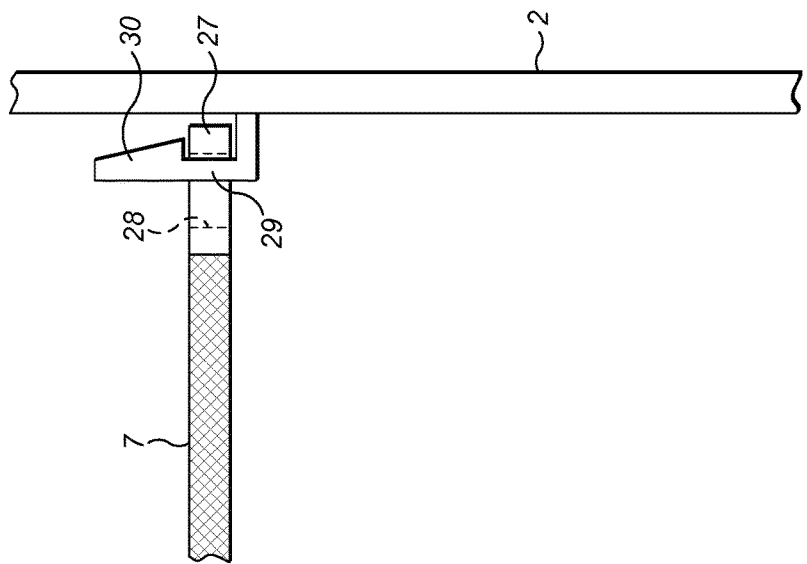
FIG. 8 shows an enlarged side view of attaching means for securing the filter element to the cooking chamber of the embodiment shown in FIG. 2, in an engaged position.
Figure 7:
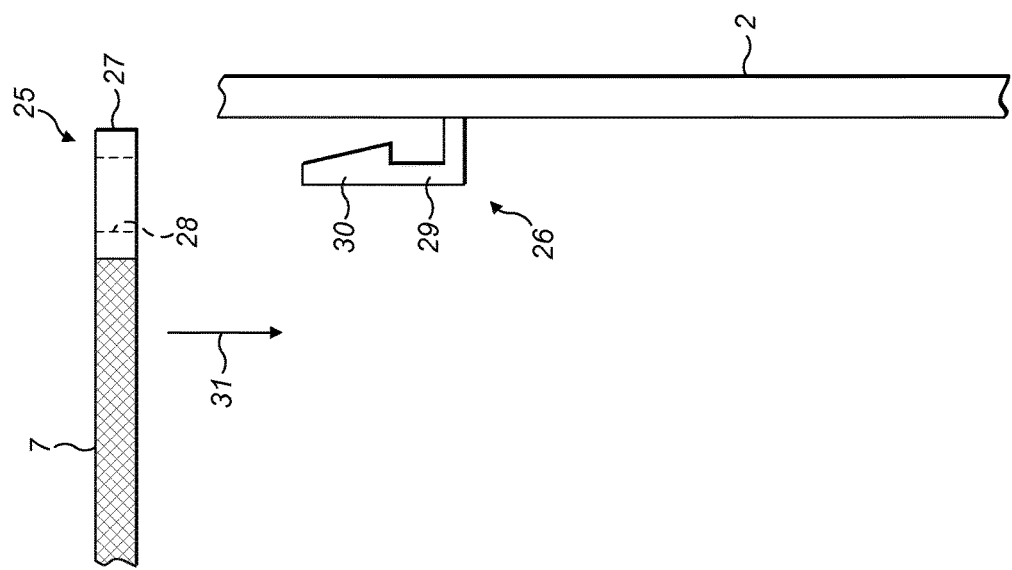
FIG. 7 shows an enlarged side view of attaching means for securing the filter element to the cooking chamber of the embodiment shown in FIG. 2, in a disengaged position.

The first and second attaching means 25, 26 are shown in more detail in FIGS. 7 and 8 in a disengaged and engaged configuration. The first attaching means comprises a pair of projecting tabs 27 on opposite sides of the filter element 7, each tab having an aperture 28 therein. The second attaching means 26 comprises a correspondingly positioned pair of latch fingers 29 on opposite sides of the cooking chamber 2, projecting inwardly from the inside wall of the cooking chamber 2. Each latch finger 29 comprises a pawl 30 proximate a remote end thereof. The latch fingers 29 are resiliently deformable.

To secure the filter element 7 to the cooking chamber 2, the filter element 7 is placed into the cooking chamber 2 with the projecting tabs 27 aligned with the latch fingers 29. The filter element 7 is moved downwards into position, as shown by arrow 31 in FIG. 7, such that the latch fingers 29 pass through the apertures 28 in the projecting tabs 27, until the pawls 30 engage over the edge of the apertures 28 to secure the filter element 7 in position. To detach the filter element 7 from the cooking chamber 2, the latch fingers 29 are deflected inwardly so that the pawls 30 sit clear of the edges of the apertures 28 and the filter element 7 can be lifted upwardly out of the cooking chamber 2.

The cooking apparatus 1 of the second embodiment is shown and described with projecting tabs 27 and latch fingers 29 as the first and second attaching means 25, 26 which secure the filter element 7 to the cooking chamber 2. However, the invention is not intended to be limited to this configuration of attaching means 25, 26 and alternative attaching means may be provided within the scope of the invention. Such alternative configurations of attaching means 25, 26 may include cooperating clips, cooperating snap-fit connectors or magnetic attaching means.

In cooking apparatuses 1 of both the first and second embodiments of the invention described above, the filter element 7 is spaced from the heating element 5. In particular, the filter element 7 is spaced from and not secured to, the heating element 5 or any heat guard or shield (not shown) that may surround the heating element 5, such that the filter element is secured to a portion of cooking apparatus 1 other than heating element 5 or and guard or shield member it may include. This spacing of the filter element 7 helps ensure a sufficient distance of the heating element 5 to avoid heat from the heating element 5 burning any food particles or oil or fat that may be caught by the filter element 7 which could generate smoke, even though the filter element had prevented the food particles/oil/fat from directly contacting the heating element. Such spacing from the heating element and its associated guard or shield members also helps prevent heat from being conveyed to the filter element 7 by conduction, further helping prevent the generation of smoke from the caught food particles, oil or fat.

The above embodiments as described are only illustrative, and not intended to limit the technique approaches of the present invention. Although the present invention is described in details referring to the preferable embodiments, those skilled in the art will understand that the technique approaches of the present invention can be modified or equally displaced without departing from the spirit and scope of the technique approaches of the present invention, which will also fall into the protective scope of the claims of the present invention. In the claims, the word "comprising" does not exclude other elements or steps, and the indefinite article "a" or "an" does not exclude a plurality. Any reference signs in the claims should not be construed as limiting the scope.

The invention claimed is:

1. A cooking apparatus comprising:
    a cooking chamber;
    a food basket disposed within the cooking chamber to receive food to be cooked, the food basket comprising a bottom wall, side walls extending upward from the bottom wall, and an upper opening defined by the side walls;
    a heater disposed above the food basket for heating air flowing out from the food basket;
    a fan and at least one air flow passage for circulating the heated air upwards through the food basket; and
    a filter element removably and directly attached to the side walls of the food basket, wherein the filter element extends across the upper opening of the food basket, wherein the filter element being spaced from the heater, wherein the filter element comprising an air-permeable meshed structure for retaining particles contained in the heated air flowing out from the food basket, wherein an opacity of the filter element in an area projected directly beneath the heater is defined by an opacity ratio, which is a ratio of a first area to a sum of the first area and a second area, and wherein the first area is an open area occupied by an aperture from a plurality of apertures of the filter element and the second area is an area occupied by wires forming the plurality of apertures;
    wherein the filter element comprises first attaching means located at opposite side edges of the filler element, and the food basket comprises second attaching means located at the side walls of the food basket, the first attaching means and the second attaching means being adapted to cooperate to removably attach the filter element to the side walls of the food basket.

2. The cooking apparatus according to claim 1, wherein the filter element has the opacity of at least 50%.

3. The cooking apparatus according to claim 1, wherein the filter element has the opacity of at least 50% in the area of the filter element projected directly beneath the heater.

4. The cooking apparatus according to claim 1, wherein the air-permeable meshed structure of the filter element comprises the plurality of apertures with maximum outer dimensions not exceeding 1 mm by 1 mm.

5. The cooking apparatus according to claim 4, wherein the maximum outer dimensions of the plurality of apertures are between 0.3 mm by 0.3 mm and 1 mm by 1 mm.

6. The cooking apparatus according to claim 4, wherein the plurality of apertures of the air-permeable meshed structure of the filter element are of a uniform shape.

7. The cooking apparatus according to claim 4, wherein shapes of the plurality of apertures of the air-permeable meshed structure of the filter element are square, rectangular, hexagonal, or regular polygonal.

8. The cooking apparatus according to claim 1, wherein the first attaching means comprises a pair of projections formed along opposite edges of the filter element, and the second attaching means comprises a correspondingly positioned pair of latch mechanisms on the side walls of the food basket.

9. The cooking apparatus according to claim 8, wherein each latch mechanism comprises a latch member connected to a lever, the lever being pivotally attached to one of the side walls of the food basket, and the latch member being pivotally connected to the lever between remote ends of the lever.

10. A cooking apparatus comprising:
    a cooking chamber;
    a basket disposed within the cooking chamber, containing food to be cooked, the basket comprising a bottom wall, side walls extending upward from the bottom wall, and an upper opening defined by the side walls;
    a heater disposed above the basket for heating air flowing out from the basket;
    a fan and at least one air flow passage outside the basket for circulating the heated air from the heater through the bottom wall of the basket; and
    a filter removably and directly latched at edges to the side walls of the basket, wherein the filter extends across the upper opening of the basket, wherein the filter comprising an air-permeable meshed structure for retaining particles contained in the heated air flowing out from the basket to prevent the retained particles from contaminating the heater, wherein an opacity of the filter element in an area projected directly beneath the heater is defined by an opacity ratio, which is a ratio of a first area to a sum of the first area and a second area, and wherein the first area is an open area occupied by an aperture from a plurality of apertures of the filter element and the second area is an area occupied by wires forming the plurality of apertures
    wherein the filter element comprises first attaching means located at opposite side edges of the filler element, and the food basket comprises second attaching means located at the side walls of the food basket, the first attaching means and the second attaching means being adapted to cooperate to removably attach the filter element to the side walls of the food basket.

11. The cooking apparatus according to claim 10, further comprising:
    air flow guide for diverting the heated air from the at least one air flow passage through at least one opening in the bottom wall of the basket and into contact with the food to be cooked.

12. The cooking apparatus according to claim 10, wherein the filter has the opacity of at least 50%.

13. The cooking apparatus according to claim 10, wherein the first attaching means comprises a pair of projections formed at the opposite edges of the filter, and the second attaching means comprises a correspondingly positioned pair of latch mechanisms on the side walls of the basket.

14. The cooking apparatus according to claim 13, wherein each latch mechanism comprises a latch member connected to a lever, the lever being pivotally attached to one of the side walls of the basket, and the latch member being pivotally connected to the lever between remote ends of the lever.

15. A cooking apparatus comprising:
a cooking chamber;
a basket disposed within the cooking chamber, containing food to be cooked, the basket comprising a bottom wall, side walls extending upward from the bottom wall, and an upper opening defined by the side walls;
a heater disposed above the basket for heating air flowing out from the basket;
a fan and at least one air flow passage outside the basket for circulating the heated air from the heater through the bottom wall of the basket;
a filter removably and directly attached to the side walls of the basket, wherein the filter extends across the upper opening of the basket, such that the filter is positioned between an upper end of the basket and the heater, wherein the filter comprising an air-permeable meshed structure for retaining particles contained in the heated air flowing out from the basket to prevent the retained particles from contaminating the heater, wherein an opacity of the filter element in an area projected directly beneath the heater is defined by an opacity ratio, which is a ratio of a first area to a sum of the first area and a second area, and wherein the first area is an open area occupied by an aperture from a plurality of apertures of the filter element and the second area is an area occupied by wires forming the plurality of apertures; and
latch mechanisms comprising projections attached to opposite edges of the filter, levers attached to the side walls of the basket, and latch members attached to the levers for cooperating with the projections, respectively, to removably attach the filter to the side walls of the basket.

16. The cooking apparatus according to claim 15, further comprising:
air flow guide for diverting the heated air from the at least one air flow passage through at least one opening in the bottom wall of the basket and into contact with the food to be cooked.

17. The cooking apparatus according to claim 15, wherein the filter has the opacity of at least 50%.

18. The cooking apparatus according to claim 15, wherein the filter has the opacity of at least 50% only in the area of the filter projected directly beneath the heater.

* * * * *